United States Patent
Ettischer

[15] 3,685,408
[45] Aug. 22, 1972

[54] SHUTTER CONTROL APPARATUS FOR PHOTOGRAPHIC CAMERAS

[72] Inventor: Helmut Ettischer, Wangen, Germany

[73] Assignee: Eastman Kodak Company

[22] Filed: Feb. 25, 1971

[21] Appl. No.: 118,746

[30] Foreign Application Priority Data

March 7, 1970 Germany..........P 20 10 853.6

[52] U.S. Cl.....................95/10 C, 95/53 EB, 95/60
[51] Int. Cl..............................G03b 7/08, G03b 9/58
[58] Field of Search........95/53 R, 53 EB, 58, 59, 60, 95/10 C, 10 CT

[56] References Cited

UNITED STATES PATENTS

| | | |
|---|---|---|
| 3,545,352 | 12/1970 | Bellows..........................95/60 |
| 3,459,112 | 8/1969 | Starp et al. ....................95/60 |
| 2,800,844 | 7/1957 | Durst et al.....................95/60 |
| 3,472,137 | 10/1969 | Galbraith, Jr............95/10 CT |

Primary Examiner—Joseph F. Peters, Jr.
Attorney—W. H. J. Kline

[57] ABSTRACT

In a camera having a photoelectric-timing circuit for determining shutter speed in accordance with the level of scene illumination, including an opening blade actuatable to initiate an exposure interval and a closing blade retained by an armature movable by an electromagnet controlled by the timing circuit to release the closing blade. A spring biased lock is provided for locking the armature and the closing blade during opening of the opening blade. The spring bias is released prior to attraction of the armature by the electromagnet to close the closing blade.

6 Claims, 4 Drawing Figures

PATENTED AUG 22 1972  3,685,408

HELMUT ETTISCHER
INVENTOR.

BY James A. Smith
W. H. J. Kline
ATTORNEYS

SHUTTER CONTROL APPARATUS FOR PHOTOGRAPHIC CAMERAS

BACKGROUND OF THE INVENTION

1. Field of the Invention

This invention relates generally to shutter mechanisms for use in photographic cameras, and more particularly to shutter mechanisms controlled by light-integrating, timing circuit for establishing shutter speed in accordance with the level of scene illumination.

2. Description of the Prior Art

Many photographic cameras presently available are provided with shutter systems of the type including a light-integrating timing circuit for determining shutter speed. Typically, the timing circuit is activated in synchronization with movement of an opening blade or blade ring to initiate an exposure interval, and the circuit subsequently actuates a closing blade or blade ring to terminate the exposure interval after a time period established by the circuit in accordance with the intensity of light received by a photocell in the circuit. There are many known shutter blade arrangements employed in such systems. For example, the opening blade typically is releasably held in an aperture blocking position by a camera release lever and is moved under the influence of a bias to expose the aperture and initiate the timing cycle upon actuation of the release lever. The closing blade usually is actuated in response to an electromagnet releasably holding an armature or a keeper on the blade during the timed exposure. When the timing cycle has been completed the control circuit deenergizes the electromagnet to release the blade for movement to an aperture blocking position, terminating the exposure.

In the case of the aforementioned shutter mechanisms, a device is known whereby the electromagnet influences a locking mechanism holding the closing blade in its aperture unblocking position for the time of exposure (see for example German Pat. No. 1,248,464). It was the object of this patent that shutter mechanisms employing holding electromagnets be so improved that the release of the closing blade from its aperture unblocking position be affected with as little delay as possible. This device uses a frictional locking mechanism clamped at the edge of closing blade during the complete period of exposure. The part of the device engaging the closing blade is formed of resilient material, and its impact on the portion of the locking mechanism in the blade open position is clamped so that the electromagnet cannot be pulled away from the locking mechanism.

The known solution relates to the so-called self-cocking shutter which use a holding electromagnet which releases the closing blade at the end of the exposure interval. These are substantially different from impact shutters which use an impact device to open the opening shutter blade, and employ an attracting electromagnet energized at the end of the exposure interval to attract the armature, releasing the closing blade.

In the shutter mechanisms employing impact drivers and attracting electromagnets there is also the risk of the closing blade following immediately after the opening blade. This means that immediately after actuation of the opening blade the closing blade follows and blocks the exposure aperture. This malfunction may be due to a plurality of factors. One such factor is that a spring force acting on the armature maintaining the armature against the closing blade is designed as weak as possible so that only a small attractive force of the electromagnet is necessary to attract the armature away from the closing blade. If due to the impact of the drive portion on the opening blade, vibration occurs upon release of the shutter, the closing blade will be influenced so that it may perhaps be released. In order to optimize the attractive effort of the electromagnet at given spaced relations of the electromagnet and the armature and considering the requirement for failsafe operation over a relatively great voltage range of the battery, the path of the armature movement must be very short, that is to say the depth of engagement for locking the closing blade is to be held as small as possible. The friction at this point of engagement of the armature and the closing blade, however, must be held at a minimum. It may otherwise happen that the shutter will not be closed to terminate the exposure interval.

SUMMARY OF THE INVENTION

Therefore, it is an object of the present invention to provide a solution warranting failsafe operation of the shutter at all shutter speeds and preventing the closing blade both from following immediately after the opening blade, or from remaining open due to the locking mechanism not releasing the closing blade in response to actuation of the electromagnet.

It is another object of the present invention to provide an improved simple construction for a shutter mechanism so that the current source may be economically utilized down to a relatively low battery voltage level.

In accordance with these and other objects, there is provided in accordance with the teachings of this invention a camera having a shutter apparatus for exposing an aperture to object scene light including a light-integrating timing circuit for establishing an exposure interval, the apparatus including a two-blade shutter featuring an opening blade which is released upon actuation of the camera to expose the aperture, and a closing blade which is released by means of an armature movable from a first position where it retains the closing blade in an aperture exposing position, to a second position in response to attraction by electromagnetic means operable by the timing circuit at the end of an exposure interval to release the closing blade for movement to close the exposure aperture. More specifically, a lock is provided wherein the lock biases the armature into engagement with the closing blade in the first position, the lock insuring the engagement of the armature and the closing blade during the opening phase of the opening blade. However, the lock is released prior to actuating the electromagnetic means to move the armature to the second position to release the closing blade for movement to cover the exposure aperture.

In one illustrative embodiment the lock comprises a lever movable by a spring to a first position, wherein the lever engages the armature and locks the closing blade in its unblocking position, and movable to a second position by an impact driver, out of engagement with the armature unlocking the armature prior to release of the closing blade for movement to terminate the exposure interval.

In another illustrative embodiment of the invention the lock comprises a spring engaging the armature and detent on the opening blade, the spring being in tension locking the armature in its unblocking position during opening of the opening blade which tension is released by the opening of the opening blade.

The invention, and its objects and advantages, will become apparent in the detail description of the preferred embodiments presented in conjunction with the accompanying drawings.

DETAILED DESCRIPTION OF THE DRAWING

Because cameras are well known, the present description will be directed in particular to elements forming part of or cooperating more directly with the present invention. The camera elements not specifically shown or described may take various forms well known to those skilled in the art.

Figure 1:
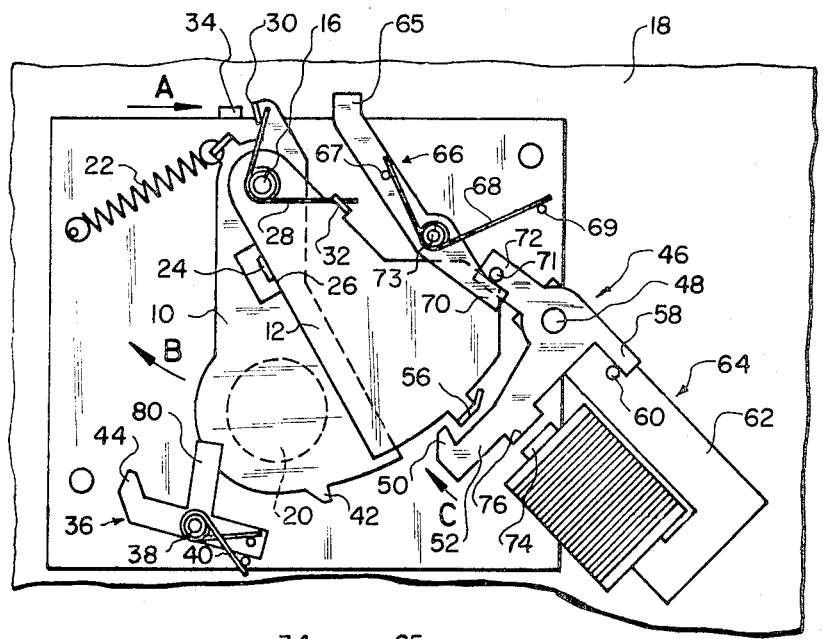
FIG. 1 is an embodiment of a two-blade shutter in its cocked position showing the armature in a locked condition.
Figure 2:
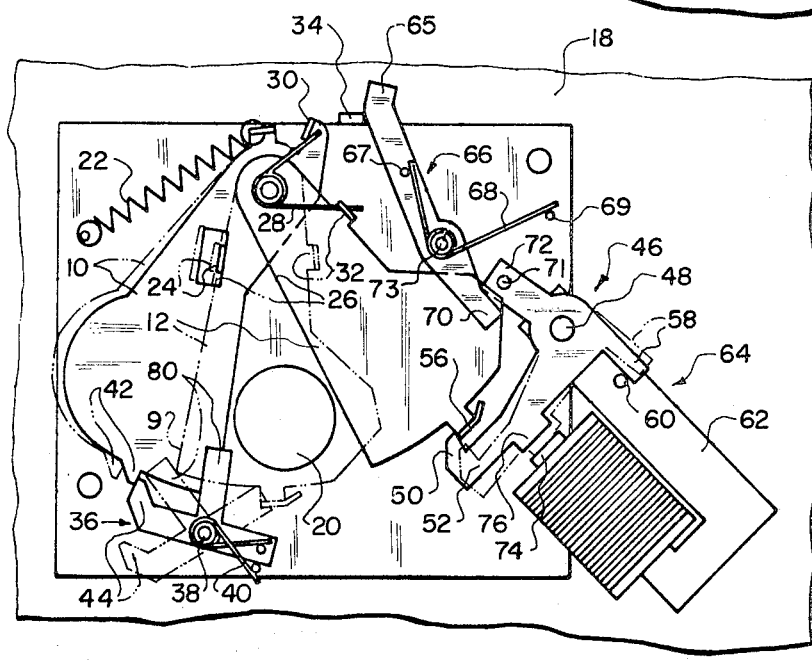
FIG. 2 is the shutter according to FIG. 1, the opening blade having been moved to its opened position with the armature in the unlocked condition and phantom lines showing the position of the closing blade after release by the armature.

Referring to FIGS. 1 and 2 there is shown a shutter mechanism according to the invention including an opening blade 10 and a closing blade 12, each of which is pivotally mounted on a pin 16 attached to a camera support plate 18. The blades 10, 12 are mounted for movement into, and out of, blocking positions with respect to an exposure aperture 20 on the support plate 18, to initiate and terminate exposure intervals. Blocking and unblocking positions refer to shutter blade positions such that the aperture 20 is either exposed to object scene light or object scene light is blocked from entering the exposure aperture 20. In the cocked condition shown in FIG. 1, the opening shutter blade 10 is biased to an aperture blocking position by a spring 22, and into engagement with a closing blade 12 where a detent 24 on the opening blade abuts edge 26 of the closing blade 12, retaining the closing blade 12 in an aperture unblocking position. In the cocked position of FIG. 1, a spring 28, tensioned against a projection 30 on the opening blade 10, and an ear 32 on the closing blade 12, biases the closing blade 12 to an aperture blocking position. A shutter driver 34 is provided which is biased in the direction of arrow A, by means not shown, toward engagement with a projection 30 on the opening shutter blade 10, and is retained, by means not shown, against its bias in the cocked position.

The shutter mechanism is actuated when a camera operator operates a camera release mechanism, not shown, to release the shutter driver 34 for movement under its bias, in the direction of arrow A to drive the shutter blade 10 away from its blocking position and in the direction of arrow B, against the bias of the spring 22, to a position unblocking the exposure aperture 20, to initiate an exposure interval.

A releasable latch 36 is positioned in the path of movement of the opening blade 10 during the opening movement, which latch 36 is pivotally mounted on a pin 38 on the support plate 18. The latch 36 is maintained in the cocked position of FIG. 1 by the bias of a spring 40, so that at the end of the opening movement, when the opening blade 10 unblocks the exposure aperture 20, a detent 42 on the opening blade 10 will engage a projection 44 on the latch 36, as shown in FIG. 2, latching the opening blade 10 in an aperture unblocking, or aperture exposing position.

An armature 46 is provided, pivotally mounted on a pin 48 secured on the support plate 18. The armature 46 has an arm 52 with a hooked end 50 adjacent to a foot 56 on the closing blade 12. The hooked end 50 is positioned relative to the closing blade 12 to engage the foot 56 on the closing blade 12, when the opening blade 10 is released, thereby retaining the closing blade 12. As shown in the cocked position of FIG. 1, the armature 46 is positioned relative to the foot 56 by means of an extended piece 58 on the armature 46 which engages a pin 60 on a yoke 62 of a suitable electromagnet 64. The armature 46 is biased in the direction of arrow C by an elongated lever 66 which is pivotally mounted on a pin 73 secured on the support plate 18, and biased into engagement with the armature 46 by a spring 68. The spring 68 is held in tension, biasing the lever counterclockwise, by a pin 67 on the lever 66 and a pin 69 on the support structure 18. An end 70 of the lever 66 engages pin 71 of a projection 72 on the armature 46 biasing the armature 46 in the direction of arrow C to the position where the extended piece 58 engages the pin 60, locking the armature 46 in the position of FIG. 1. The lever 66 has another end 65, positioned in the path of movement of the shutter driver 34 so that as the shutter driver 34 nears the end of its movement it will engage the end 68, and pivot the lever 66 against the bias of the spring 68, to a position out of engagement with the armature 46 as shown in FIG. 2. Pivoting the lever 66 out of engagement with the armature 46, unlocks the armature 46 so that it may be rotated counterclockwise under the attraction of the electromagnet 64, as shown further in FIG. 2.

Figure 4:
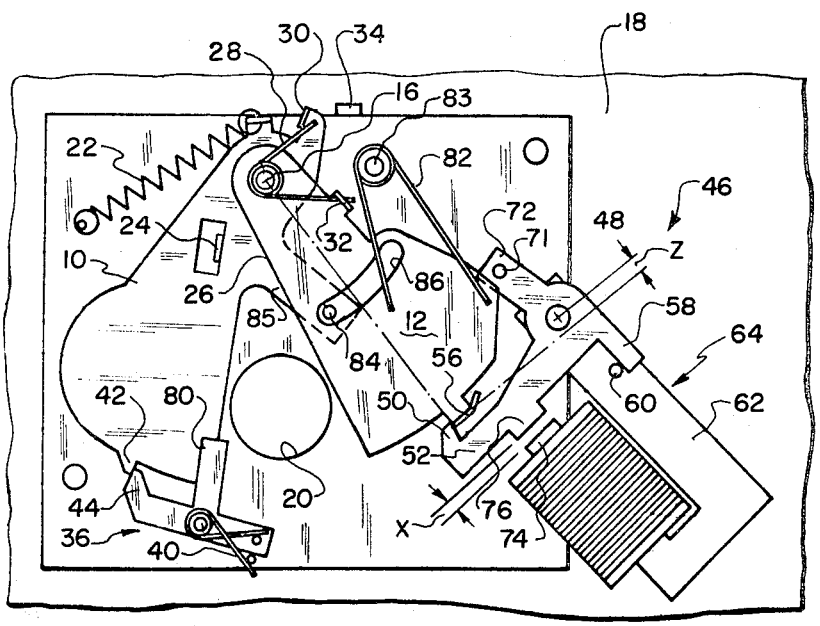
FIG. 4 is the shutter according to FIG. 3, the opening blade having been moved to its opened position with the armature in the unlocked position, and phantom lines showing the position of the closing blade after release by the armature.

The electromagnet 64 has a polepiece 74 placed adjacent to an extension 76 on the armature 46, which extension 76 is attracted by the electromagnet, through an air gap as indicated as X of FIG. 4. When operating the camera repeatedly, the repeated operation of the electromagnet 64 may build up a residual magnetism in the electromagnet 64 which may attract the armature 46 during periods that the closing blade 12 should not be operative, or that the lever 66 does not retain the armature 46 in the position of FIG. 1. To offset the effects of the residual magnetism and provide greater reliability for the shutter mechanism, the armature 46 should theoretically be placed on a line perpendicular to a dash-dotted line along the point of intersection of the hooked end 50 and the foot 56, as shown in FIG. 4, and having its pivot point offset by a moment arm Z from the line of force where the hooked end 50 of the armature 46 acts upon the foot 56 of the closing blade 12. The placement of the armature 46 as shown in FIG. 4 provides a moment arm about the pin 48, which moment arm offsets the moment arm developed by the force of the residual magnetism in the electromagnet 64 acting upon the arm 52.

In operation of the apparatus, the release mechanism is operated to release the shutter driver 34 for movement in the direction of arrow A where it engages the projection 30 on the opening blade 10 pivoting the opening blade 10 in the direction of arrow B, to a position exposing the aperture 20. As the opening blade 10 completes its movement, the detent 24 on the opening blade 10 engages the projection 44 of the latch 36 locking the blade 10 in an aperture exposing position. As the opening blade 10 pivots, the detent 24 on the opening blade 10 releases the closing blade 12 for pivotal movement, also in the direction of arrow B, to a position where the foot 56 on the closing blade 12 engages the hooked end 50 on the armature 46 and both the opening blade 10 and the closing blade 12 are locked in an aperture exposing position during the timed exposure interval. The shutter driver 34 continues to move under bias in the direction of arrow A until it engages the lever 66. Engagement of the shutter driver 34 and the lever 66 pivots the lever 66 out of engagement with the armature 46 leaving the closing blade 12 held by only the engagement of the hooked end 50 on the armature 46 and the foot 56 of the closing blade 12. At the end of the timed exposure interval, the electromagnet 64 is energized, by circuitry not shown but well known in the art, to attract the armature 46, pivoting it out of engagement with the foot 56 allowing the closing blade 12 to move under the bias of the spring 28 to close the aperture 20, as shown by the phantom lines of FIGS. 2, 4. As further shown by the phantom lines of FIG. 2, 4, when the closing blade 12 reaches it terminal position, it engages an extension 80 on the latch 36 pivoting the latch 36 out of engagement with the detent 42 on the opening blade 10 and the opening blade 10 is returned to the position of FIG. 1, under the bias of the spring 22. As the opening blade 10 returns to the cocked position of FIG. 1 the detent 24 engages the edge 26 of the closing blade 12 returning it to the position of FIG. 1. The return motion of the closing blade 12 releases the latch 36 to rotate under the bias of the spring 40 to the locking position of FIG. 1. Also when the shutter driver 34 is returned to the position of FIG. 1, by conventional cocking means well known in the art, the bias of the spring 68 returns the lever 66 to a position engaging the armature 46, locking the armature in the position of FIG. 1, for the next exposure interval.

Figure 3:
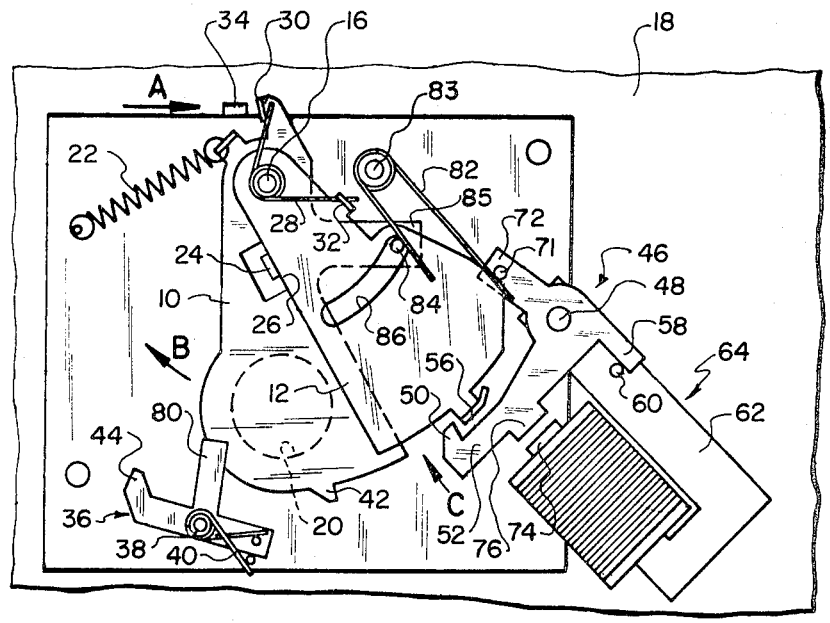
FIG. 3 shows another embodiment of a two-blade shutter in its cocked position having a spring locking the armature.

In another illustrated embodiment of the invention shown in FIGS. 3 and 4, the lever 66 and spring 58 are replaced by a spring 82, mounted on a pin 83 on the support plate 18, which spring 82 biases the armature 46 in a position wherein the foot 56 will engage the hooked end 50 on the armature 46 as the opening blade 10 moves to an aperture exposing position. The spring 82 is held in tension, locking the armature 46 in the position of FIG. 1, by a pin 84 on an extension 85 of the opening blade 10, and the pin 71 on the armature 46. A slot 86 is provided on the closing blade 12 so that as the opening blade 10 pivots to an aperture exposing position (in the direction of arrow B of FIG. 3) the pin 84 moves in the slot 86 substantially releasing the tension on the spring 82. Release of the tension in the spring 82 unlocks the armature 46 for counterclockwise rotation under the attraction of the electromagnet 64, when it is energized.

The mechanism of FIGS. 3, 4 utilize the latch 36 as does the mechanism of FIGS. 1, 2 to latch the opening blade 10 in the aperture exposing position, as shown in FIG. 4. Also, as shown in FIG. 4, as the closing blade 12 closes, it engages the extension 80 on the latch 36, rotating the latch 36 out of engagement with the opening blade 10, and the opening blade 10 is returned to the position of FIG. 3 by the bias of the spring 22. During the return movement of the opening blade 10 to the aperture blocking position of FIG. 3, the detent 24 on the opening blade 10 engages the edge 26 on the closing blade 12, returning and holding the closing blade 12 in the position of FIG. 3.

The invention has been described in detail with particular reference to preferred embodiments thereof, but it will be understood that variations and modifications can be effected within the spirit and scope of the invention.

I claim:

1. In a camera adapted to expose film to scene illumination through an exposure aperture shutter control apparatus including:
   a. light-integrating circuit means for producing a control signal a period of time after activation thereof, the period of time being related to the intensity of scene illumination;
   b. a first shutter blade movable from a first position blocking the exposure aperture to a second position unblocking the exposure aperture;
   c. means for moving said first shutter blade to its second position;
   d. means for activating said circuit means in timed relation to the actuation of said first shutter blade;
   e. a second shutter blade movable from a first position unblocking the exposure aperture to a second position blocking the exposure aperture;
   f. a detent member for retaining said second shutter blade in its first position;
   g. means for releasing said detent member to permit said second shutter blade to move from its first position to its second position to terminate the exposure interval in response to the control signal from said circuit means; the improvement comprising:
   h. lock means for disposing said detent member into a retaining relationship with said second shutter blade when said second shutter blade is in its first position, said lock means maintaining the retaining relationship of said detent member to said second shutter blade during the movement of said first shutter blade to its second position, said lock means being released prior to actuation of said releasing means to permit the movement of said second shutter blade to its second position.

2. In a camera adapted to expose film to object scene light through an exposure aperture the combination comprising, a light-integrating, timing circuit to establish an exposure interval related to the object scene light, a shutter mechanism having an opening blade which is disposed from an aperture blocking position to an aperture unblocking position on actuation of the camera and a closing blade retained in an aperture unblocking position by a detent member, said detent member being moved by drive means to permit said closing blade to be disposed in its aperture blocking position in response to activation of said timing circuit to terminate the exposure interval, and lock means for disposing said detent member into a retaining relationship with said closing blade to maintain said closing blade in its aperture unblocking position during the movement of said opening blade to its aperture unblocking position, said lock means being released prior to actuating said drive means to permit the movement of said closing blade to its aperture blocking position.

3. Shutter control apparatus as claimed in claim 2 wherein said lock means comprises a spring engaging said detent member and a projection on said opening blade, said spring being in tension for biasing said detent member in a retaining relationship with said closing blade when said closing blade is disposed in its aperture unblocking position during movement of said opening blade to its aperture unblocking position, which tension is released substantially by the deposition of said opening blade to its aperture unblocking position.

4. Apparatus as claimed in claim 3, wherein said detent member comprises an armature being pivotally mounted about a point and having a portion exerting a retaining force on said closing blade to produce a first moment about said point, and an electromagnetic device energizable by the timing circuit, said electromagnetic device acting on said armature to produce a second moment, the first moment having a magnitude sufficient to overcome the second moment.

5. In a camera adapted to exposure film to object scene light through an aperture, the combination comprising, a light-integrating, timing circuit to establish an exposure interval in accordance with the object scene light, shutter means comprising an opening blade which is disposed from an aperture blocking position to an aperture unblocking position upon the actuation of the camera to initiate an exposure interval, a closing blade retained in an aperture unblocking position by a detent member during movement of said opening blade to its aperture unblocking position, which detent member is released by means of an electromagnet actuated by said timing circuit to permit said closing blade to move to its aperture blocking position to terminate the exposure interval, lock means for locking said closing blade in its aperture unblocking position during opening of said opening blade, said lock means including a control member movable from a first position against a spring bias wherein said control member retains the detent member in a retaining relationship with said closing blade when said closing blade is in its aperture unblocking position, and means for disposing said control member to a second position out of the retaining relationship with said detent member prior to actuation of said electromagnet to permit said closing blade to move to its aperture blocking position.

6. Apparatus as claimed in claim 4 wherein said disposing means comprises a shutter driver positioned to engage said control member releasing said control member from the retaining relationship with said detent member.

* * * * *